United States Patent
Grier et al.

(10) Patent No.: US 7,142,960 B2
(45) Date of Patent: Nov. 28, 2006

(54) PRIORITIZED TEST PROCEDURE AND STEP DISPLAY USING STATISTICAL FEEDBACK

(75) Inventors: Jeff Grier, Royal Oak, MI (US); James J. Cancilla, San Jose, CA (US); Sunil P. Reddy, Corpus Christi, TX (US); Dale A. Trsar, Mt. Prospect, IL (US); Bradley R. Lewis, Gilroy, CA (US)

(73) Assignee: Snap-on Incorporated, San Jose, CA (US)

( * ) Notice: Subject to any disclaimer, the term of this patent is extended or adjusted under 35 U.S.C. 154(b) by 65 days.

(21) Appl. No.: 10/966,578

(22) Filed: Oct. 14, 2004

(65) Prior Publication Data

US 2006/0085108 A1    Apr. 20, 2006

(51) Int. Cl.
G06F 11/25 (2006.01)
G06N 7/00 (2006.01)

(52) U.S. Cl. .............................. 701/29; 701/30; 714/37
(58) Field of Classification Search .................. 701/29, 701/99, 30, 36, 34, 35, 100, 107; 702/108, 702/113; 714/1, 25, 37, 41
See application file for complete search history.

(56) References Cited

U.S. PATENT DOCUMENTS

| | | | |
|---|---|---|---|
| 4,633,467 A * | 12/1986 | Abel et al. ..................... | 714/45 |
| 4,649,515 A * | 3/1987 | Thompson et al. ............ | 706/52 |
| 4,796,206 A | 1/1989 | Boscove et al. ............... | 701/99 |
| 5,250,935 A | 10/1993 | Jonker et al. ............ | 345/440.1 |
| 5,253,184 A * | 10/1993 | Kleinschnitz ................ | 702/184 |
| 5,533,093 A | 7/1996 | Horton et al. ................. | 379/21 |
| 5,537,644 A | 7/1996 | Hamilton et al. ............. | 395/10 |
| 5,835,871 A * | 11/1998 | Smith et al. .................. | 701/29 |
| 6,141,608 A | 10/2000 | Rother ......................... | 701/33 |
| 6,336,065 B1 * | 1/2002 | Gibson et al. ................ | 701/29 |

(Continued)

FOREIGN PATENT DOCUMENTS

EP    0424869    10/1990

(Continued)

OTHER PUBLICATIONS

Snap-on, Inc., "*MODIS Modular Diagnostic Information System*", product description Stock EEMS300C02, 3 pages, (Jun. 22, 2004).

*Primary Examiner*—Dalena Tran
(74) *Attorney, Agent, or Firm*—McDonnell Boehnen Hulbert & Berghoff LLP

(57) ABSTRACT

A method is provided for updating a fault tree used in diagnosis of a condition of a machine. The fault tree is a sequence of test modules. Each of the test modules is assigned a confidence score indicating the likelihood that the test module will lead to a diagnosis. The method comprising the steps of obtaining service data from a plurality of service occasions for like machines, revising the confidence score for at least one test module in the fault tree based on the service data; and revising the sequence of the test modules in the fault tree based on the revised confidence score(s). The sequence is revised such that the most likely modules to result in a diagnosis are listed first, and the least likely ones are listed last. The re-ordering is based on feedback from actual service instances in the field, and thus is more likely to reflect real-world conditions. The result is that service technicians using the revised fault trees work more efficiently, at least on a statistical basis.

34 Claims, 4 Drawing Sheets

U.S. PATENT DOCUMENTS

| | | |
|---|---|---|
| 6,714,846 B1 | 3/2004 | Trsar et al. .................... 701/33 |
| 6,757,668 B1 * | 6/2004 | Goebel et al. ................. 706/59 |
| 6,874,680 B1 | 4/2005 | Klaus et al. ................. 235/375 |
| 2002/0007237 A1 | 1/2002 | Phung et al. .................. 701/33 |
| 2004/0044499 A1 | 3/2004 | House et al. ............... 702/181 |
| 2005/0043922 A1 | 2/2005 | Weidl et al. ................. 702/183 |
| 2005/0049988 A1 | 3/2005 | Dahlquist et al. ............. 706/46 |

FOREIGN PATENT DOCUMENTS

| | | |
|---|---|---|
| EP | 042.8134 | 11/1990 |
| WO | WO 0073903 | 12/2000 |

* cited by examiner

PRIORITIZED TEST PROCEDURE AND STEP DISPLAY USING STATISTICAL FEEDBACK

BACKGROUND

This disclosure relates generally to the art of machine diagnostics and repair and also to the design of diagnostic aids such as fault trees. More particularly, the disclosure relates to a method and system of assigning priorities to individual test modules in a fault tree based on statistical feedback from persons using the fault tree in the field. A benefit of the disclosure is that it allows the fault tree to be revised, based on the statistical feedback, and allows future users of the revised fault tree to correctly diagnose a problem with the machine more quickly.

Generally speaking, a fault tree is a flow chart in the form of a series of test steps or procedures that a technician uses to diagnose the cause of a malfunction or other condition in a machine. The machine could be any kind of machine, for example a copy machine, a printing press, a refrigerator, a medical diagnostic instrument, a component or subsystem of an aircraft, or an automobile engine. The fault tree is typically prepared for service technicians by the machine's manufacturer, but also can be authored in-house by the company owning or using the machine. Fault trees are typically published in repair or service manuals for the machine. They may also be available on-line and accessed by a technician over the Internet using a computer. The fault trees may also be stored on mobile, computer-based machine diagnostic systems, such as, for example, the Modular Diagnostic and Information System (MODIS) for vehicle repair, available from Snap-On Technologies Inc.

Fault trees are typically prepared by engineers and designers employed by the machine manufacturer, and printed and distributed at the time the machine is first manufactured and sold commercially for the benefit of field service technicians. The fault trees typically represent the machine's designer's best estimate of the optimum sequence of test procedures to arrive at a diagnosis of machine fault or error, with a minimum of trial and error. However, the real world experience of technicians in the field sometimes is very different from the predictions and estimations of the machine designers. As such, over the life of the machine the fault trees can become out of date and fail to reflect the real world experience of service technicians in the field. While fault trees are often updated, the updates are based on feedback personally provided to the author, e.g., by phone, email or input from peers.

For example, the machine designer will typically have the first test step in the fault tree calculated to uncover the designer's prediction of the most likely failure or fault given a certain symptom, the second test step to uncover the second most likely fault, etc. However, the technicians in the field may discover, for example, that the fourth test step in the fault tree is more likely to reveal the fault in the machine more than the first or second step, or that the first two steps in the procedure do not reveal the source of the problem most of the time whereas the third through fifth steps are more likely to reveal the source of the problem. Accordingly, in this situation the fault tree is out of step with the experience of the technicians. If the technician follows the fault tree in the order originally specified by the manufacturer, as they are trained to do, they spend valuable time performing diagnostic steps that make no progress towards the diagnosis more often than they should.

This disclosure provides a more automated way of examining how steps in a fault tree are used and how often they result in a correct diagnosis, and using that information to improve the fault trees.

SUMMARY

A method and system is disclosed for updating and prioritizing a sequence of test procedures such as a fault tree using statistical feedback from technicians in the field. By following the features of the present method, improved fault trees can be developed. A benefit is that the technicians work more efficiently and are more likely to arrive at the correct diagnosis of a machine fault quickly than they otherwise would using prior art approaches.

While an illustrative embodiment is described below in the context of automobile service, the methods and system are broadly applicable to any machine or system that uses a fault tree to guide a technician in uncovering the source of a fault or other condition.

In one aspect of this disclosure, a method is provided for updating a fault tree used in diagnosis of a machine. The fault tree comprises a sequence of test modules or steps. Each of the test modules is assigned a confidence score. The confidence score, which may be assigned a numerical value (e.g., from 1 to 100), is a value or index that represents a ranking or probability that the associated test module will lead to a correct diagnosis of the machine fault or condition. For example, a test module with the highest confidence score among all the modules in the fault tree is the one which is most likely to result in a successful diagnosis, and thus would be listed first in the sequence of modules forming the fault tree. A test module with a low confidence score, e.g., 10 out of 100, would be one that is rather unlikely to lead to the correct diagnosis, and thus should be listed in the test sequence after test modules with higher confidence scores, or, if it has the lowest score of all the modules, at the very end.

The method includes the step of obtaining service data from a plurality of service occasions for like machines. The service data could be obtained from a plurality of geographically distributed technicians all servicing the same type of machine. Alternatively, the service data could be obtained from multiple technicians in the same repair facility. The service data could include information such as the make and model of the machine, the symptom that prompted the service occasion, the fault tree that was used, the modules of the fault tree that were accessed, the result of the testing on each module, the ultimate diagnosis, machine conditions that were recorded during the service (e.g., failure codes, temperatures, wear readings, etc.), the repairs made, notes or comments from the technician; other repairs made, etc. The service data can be acquired manually and input into a computer and transmitted to the host system where the method is executed; alternatively the service data could be obtained by a computer-based diagnostic tool or system such as the MODIS system or the system described in U.S. Pat. No. 6,714,846 to Trsar et al., "Diagnostic Director", the contents of which are incorporated by reference herein.

The method further includes the step of revising the confidence score for at least one test module in the fault tree, based on the service data. This step could be performed by a human operator based on their expert evaluation of the service data, or automatically by a programmed computer executing an algorithm that processes fields in the service data. For example, the computer could determine that, over a given period of time such as six months (provided that there is a suitable number of service occasions to be statistically significant, say 100), module number 3 in the fault tree XYZ was more likely to lead to a successful diagnosis than module 2, but module 3 has a lower confidence score. Accordingly, the computer reassigns confidence scores such that module 3 is ranked or scored higher than module 2.

The method further includes a step of revising the sequence of the test modules in the fault tree based on the revised confidence score(s). Continuing the above hypothetical example, the computer could revise the fault tree such that module 3 is listed in the fault tree before module 2. Assuming that a statistically significant sampling of service data is available and used to revise the confidence stores, a technician following the revised fault tree is more likely to arrive at a correct diagnosis in a shorter amount of time than he otherwise would have had he used the previous fault tree. Thus, in general and as a matter of statistical probability, the revised fault tree allows the technician to work more efficiently.

In one embodiment, the fault tree is revised in a host system that generates fault trees for a plurality of geographically distributed technicians. The host system could be a design and servicing entity or division of the manufacturer of the machine. Alternatively, the host system could be a service entity or business that generates fault trees and other diagnostic tools for products of diverse manufacturers. The host system includes a computer system that is used to store and revise the fault tree. The host system also includes a database that stores field service data for the machines.

The host system may also have one or more human experts that are used in various functions, such as creating the fault trees initially, reviewing test data, interpreting the notes of technicians and revising the fault tree accordingly, and assigning confidence scores either initially, or revised confidence scores based on the service data. In an alternative embodiment, the host system includes computer readable instructions that execute an algorithm that processes the service data and generates revised confidence scores (or equivalently, rankings) for the modules in the fault tree, and creates updated, revised fault trees automatically based on the revised confidence scores.

The individual modules in the fault tree may have other attributes in addition to confidence scores, such as a numerical value indicating the number of times a test module in a fault tree was entered or accessed. This number may be useful in factoring into whether or not a change in the confidence score is indicated. For example, if a particular module in a fault tree was hardly ever entered but other modules are much more frequently entered into, the module with the low numerical value for entry probably should not have a high confidence score and may even be omitted from the fault tree entirely.

As another example, a test module may have an additional attribute assigned to it in the form of an index or numerical value indicating the technician level that the module would be displayed to. For example, if the technician is an expert, then some modules in the fault tree may be omitted from the fault tree since the experts would instinctively perform the test procedure without any prompting. These attributes, such as the number of entries, and the index of technician level, would typically be presented to the experts at the host system while they are editing the fault tree. The attributes may or may not be provided to end users that access the fault tree.

The revised fault trees can be distributed to technicians in the field in any number of ways, including hard copies of repair manuals, computer disks containing repair information and updated fault trees, as attachments to electronic mail, or as a file posted on an central server that is accessed over a computer network (e.g., a local or wide area network, e.g., Internet), a telephone line, or wireless networking technique.

Further, while the illustrated embodiment below shows a process for revising one fault tree, it will appreciated that, for any given machine, the process may be going on in parallel for all of the fault trees that exist for the machine. In the example of an entity that provides diagnostic fault trees to automotive repair shops in the United States, this process may be going on in parallel for literally thousands of fault trees, covering the years, makes and models of diverse car manufacturers since 1980 and the various ailments and repair procedures for each of the individual models. In this situation, and in other analogous situations, computer automation of the process of updating confidence scores based service data and preparation of revised fault trees as disclosed herein is particularly advantageous.

Further details regarding these and other features of the disclosure will be found by reference to the following detailed description and by reference to the appended drawing figures.

DETAILED DESCRIPTION

This disclosure provides a method and system for updating and prioritizing test procedures such as a fault tree using statistical feedback from technicians in the field. By following the features of the present method, improved fault trees can be developed. A benefit is that the technicians work more efficiently and can arrive at the correct diagnosis of a machine fault more quickly.

While an embodiment is described herein in the context of automobile repair and diagnosis, the methods and system are broadly applicable to any machine or system that uses a fault tree to guide a technician in uncovering the source of a fault or other condition.

Figure 1:
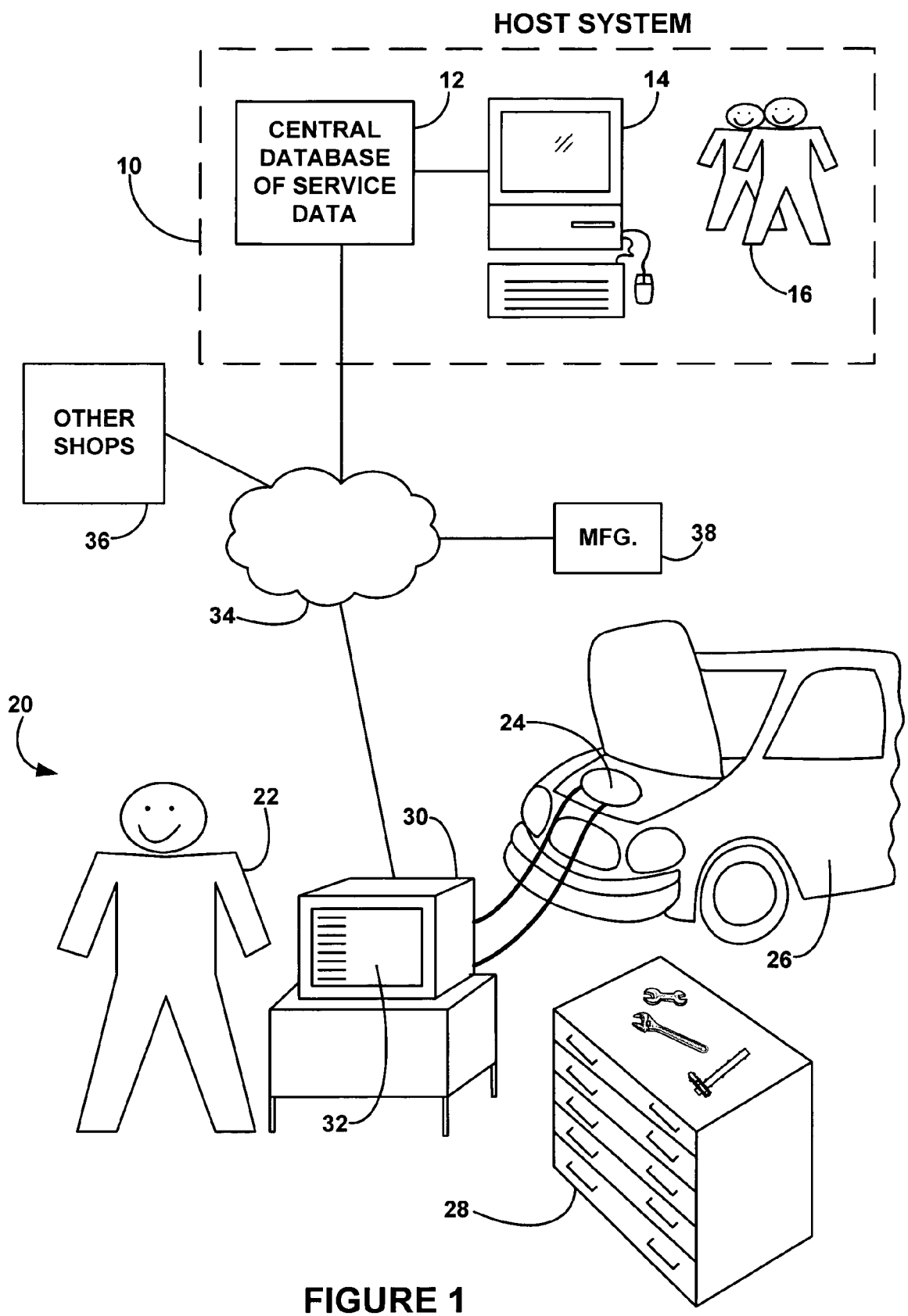
FIG. 1 is an illustration of a system using statistical feedback to improve fault trees, including a host system that generates the fault tree and a shop where the fault tree is used to diagnose a malfunction in a machine, the machine being an automobile engine or component thereof.

Referring now to FIG. 1, a system 10 is shown for receiving service data, generating revised confidence scores for modules in fault trees, and updating fault trees to reflect the revised confidence scores based on statistical feedback from service occasions. The system 10 is shown as a host system that is typically present at either the site of the manufacturer of the machine or alternatively an entity that is in the business of compiling service data and generating fault trees to assist in diagnosis of machine conditions for a distributed base of service technicians. The system 10 includes a central database 12 that receives service data from service technicians 20 in the field. The central database 12 can take the form of commercially available database and associated software and workstations, such as provided by Oracle Corporation or other database provider. The service data stored in the database could include information such as the make and model of the machine, the symptom that prompted the service occasion, the fault tree that was used, the modules of the fault tree that were accessed, the result of the testing on each module, the ultimate diagnosis, machine conditions that were recorded during the service (e.g., failure codes, temperatures, wear readings, etc.), the repairs made, notes or comments from the technician; other repairs made, etc.

The host system 10 also includes one or more general purpose computer workstations 14 that access the repair data in the database 12. The workstation 14 includes a memory that stores the fault tree of FIG. 2. The workstations are used by one or more service experts 16 who may be employed to create and revise fault trees for the machines. The service experts may, for example, access the service data and run statistical analysis applications on the data to determine which modules have been accessed, and the results that are obtained from the technicians using the modules. The experts 16 may also create initial confidence scores for the modules, revise the confidence scores, and create new fault trees based on the revised confidence scores.

Alternatively, these functions may be automated by appropriate software algorithms executing on the workstations 14. These algorithms, which can be developed by persons skilled in the art from the present disclosure, could determine that, over a given period of time such as six months, a suitable number of service occasions to be statistically significant, say 100, have occurred and that the service data for these occasions are present in the database 12. The algorithm then checks to see which modules have been accessed in these service occasions and the result of the use of the modules. The algorithm then ranks the modules in accordance with the number of times that the module resulted in the correct diagnosis. For example, for a given fault tree XYZ, it could determine that module number 3 in the fault tree XYZ was more likely to lead to a successful diagnosis than module 2, but module 3 has a lower confidence score. Accordingly, the computer reassigns confidence scores such that module 3 is ranked higher than module 2. The algorithm then could reorder the sequence of the modules in the fault tree from highest number of successful occurrences to the lowest number, and then generate a new fault tree based on the revised sequence. The date of the creation of the revised fault tree is recorded, the identification numbers for the service occasions used to create the revised fault tree are recorded, and the algorithm then proceeds to process the data associated with another fault tree. In a typical scenario, this process is occurring in parallel, on a periodic basis, for all the fault trees that may be pertinent to the given machine or machines that are of interest to the host system 10.

In the situation of FIG. 1, the service data are obtained from a set of distributed service facilities, in the present example service and repair shops 20 servicing automobiles. The technicians 22 are servicing machines, which in the present example are engines 24 in passenger cars 26, light trucks and other vehicles. The technicians have diagnostic and repair tools 28 available to them, which may include a computer based diagnostic and repair instrument 30 that hooks up to the computers in the engine 24. The instrument 30 includes a screen display 32 which provides a graphical display of machine conditions, meters for testing individual components, and a display of a fault tree and associated photographs or illustrations to assist the technician in performing a fault tree diagnosis of a fault or other condition in the engine 24.

While the service data can be acquired manually by the technician and input into a computer and transmitted to the host system 10, in other embodiments the service data are obtained by the computer-based diagnostic tool 30. A system such as the MODIS system or the system described in U.S. Pat. No. 6,714,846 to Trsar et al., "Diagnostic Director", the contents of which are incorporated by reference herein, are examples of a suitable computer-based diagnostic system. It will be appreciated that in other industries, other types of computer diagnostic devices may be used and that manner in which service data are captured and transmitted to the host system 10 is not particularly important. Examples of other devices that could be used in the automobile context are the portable service technician computer disclosed in U.S. Pat. No. 5,533,093, the computer based technician terminal disclosed in U.S. Pat. No. 4,796,206, the engine analyzer disclosed in U.S. Pat. No. 5,250,935, the diagnostic computer platform disclosed in U.S. Pat. No. 6,141,608, and the system for diagnosing and reporting failure of emissions tests in U.S. Pat. No. 5,835,871.

In the example of FIG. 1, the service data for the servicing of the car engine 24 are transmitted over a computer or telephone network using known communications techniques to the host system 10, where it is stored in the database 12. Each service occasion could be assigned a unique identification code or number. A given service occasion for the machine 24 could involve the use of more than one fault tree, depending on the symptoms of the machine and the results of using a given fault tree. The fault tree used by the technician could also take the form of a printed repair manual or service bulletin, or some other form.

It will also be understood that the shop environment 20 may be one of many different shops or sites in which service data are obtained. The other sites or shops are represented by reference 36 in FIG. 1. Also, the system 10 could be coupled to the manufacturer 38 of the engine 24 in order to obtain other data (e.g., service bulletins, new fault trees, repair information, recall information, etc.) from the manufacturer.

Figure 2:
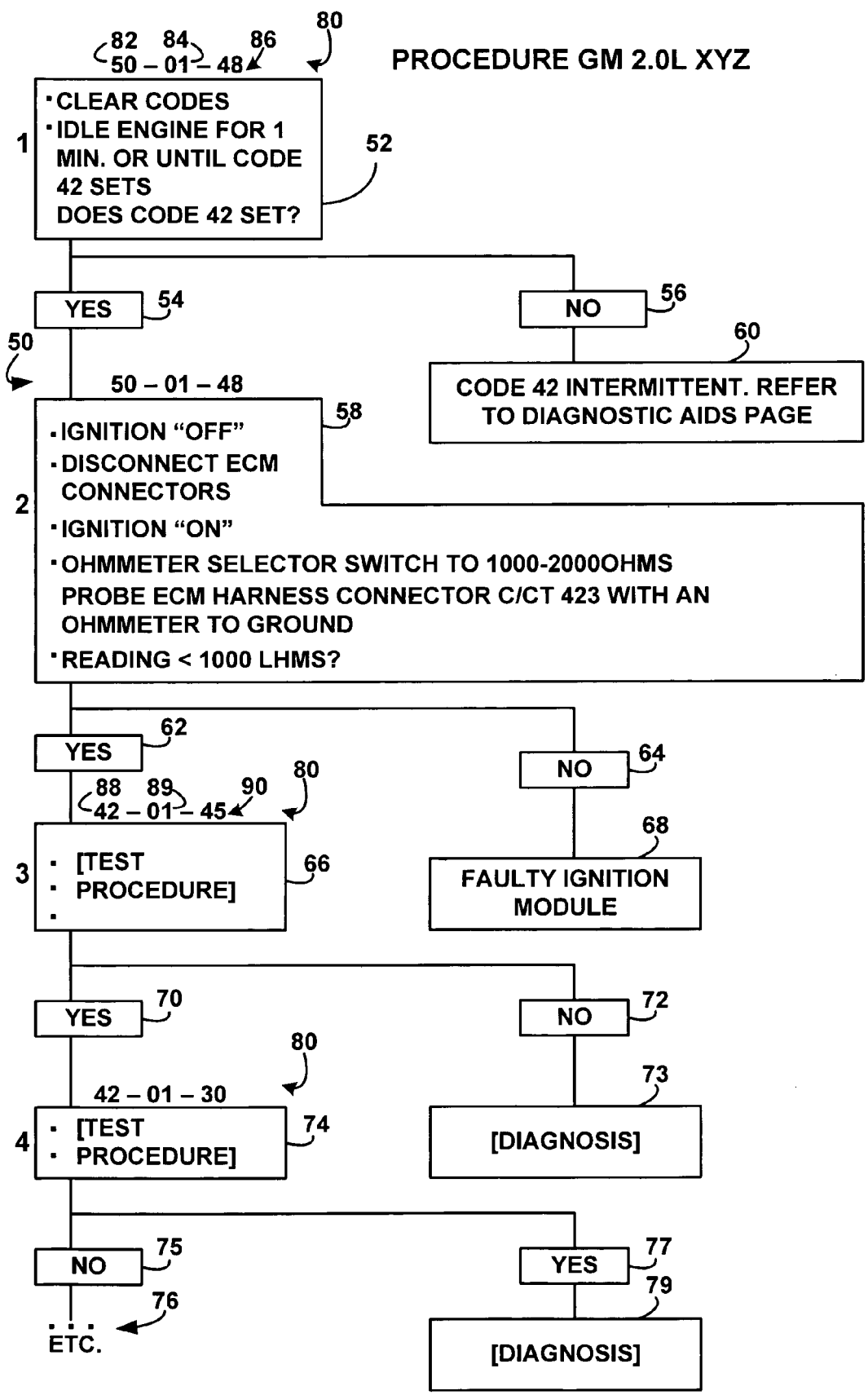
FIG. 2 is an illustration of a representative, typical fault tree for diagnosing a particular type of ailment for the machine of FIG. 1, showing three sets of numbers assigned to each test module or node in the fault tree.

FIG. 2 is an example of a hypothetical fault tree 50, with the title GM 2.0L XYZ. Assume for the purposes of this example that the fault tree is an ignition system fault tree for a General Motors 2.0 liter engine. The fault tree 50 is a flow chart in the form of a series of test steps or procedures 52, 58, 66, 74, 76 that a technician uses to diagnose the cause of a malfunction or other condition in a machine. The machine could be any kind of machine, for example a copy machine, a printing press, a refrigerator, a medical diagnostic instrument, a component of an aircraft, or an automobile engine in the example of FIG. 2. The fault tree 50 is typically prepared for service technicians by the machine's manufacturer. Fault trees are typically published in repair or service manuals for the machine. They may also be available on-line and accessed by a technician over the Internet using a computer.

In the example of FIG. 2, the first module 52 includes a series of actions or steps and the module asks whether a certain condition is met ("Does code 42 set?"). If the answer is yes as indicated at 54, the fault tree proceeds to step 58. If no (block 56), there is a diagnosis presented at block 60. The second module 58 then proceeds to another series of actions or steps and presents a question to the technician—is a particular resistance reading less than 1000 ohms. If so (block 62) the next test procedure 66 is invoked. If no (block 64), a diagnosis is made at block 68 (faulty ignition module). As is evident from FIG. 2, the fault tree includes other steps shown as 70, 72, 73, a fourth test procedure 74 another set of yes/no blocks 75 and 76, another possible diagnosis 79, and still further steps 76. The details of course are not important.

Each of the test modules 52, 58, 66, 74 is assigned a set of three numbers or attributes 80 in the illustrated embodiment. The first number in the set of three numbers is the number of times the particular test modules has been entered. The first number (82, 88 in FIG. 2) could be on a per shop basis, per technician basis, a system wide basis, or other basis. The second number (84, 89 in FIG. 2) is a technician level index. This number indicates the level of technician that the procedure or module is displayed to. For example, an index of 01 is associated with an expert technician level. An index of 02 could be associated with an apprentice or entry level technician. If the technician is an expert, then some modules in the fault tree may be omitted from the fault tree since the experts would instinctively perform the test procedure without any prompting. These attributes, such as the number of entries, and the index of technician level, would typically be presented to the experts 16 at the host system 10 while they are editing a fault tree. The attributes may or may not be provided to end users that access the fault tree.

The third number (86, 90 in FIG. 2) is a confidence score that is assigned to the test module. The confidence score, which may be assigned a numerical value (e.g., from 1 to 100), is a value or index that represents a ranking or probability that the associated test module will lead to a correct diagnosis of the machine fault or condition. For example, a test module with a highest confidence score among all the modules in the fault tree is one in which is most likely to result in a successful diagnosis, and thus would be listed first in the sequence of modules forming the fault tree. A test module with a low confidence score would be one that is rather unlikely to lead to the correct diagnosis, and thus should be listed in the test sequence after test modules with higher confidence scores.

In the example of FIG. 2, the first module 52 has a confidence score of 50. The second module 58 has a confidence score of 48. The third module 66 has a confidence score of 45. The fourth module 74 has a confidence score of 30. Thus, the modules are arranged in a sequence with the first module having the highest confidence score, the second module having the second highest confidence score, etc.

Figure 3:
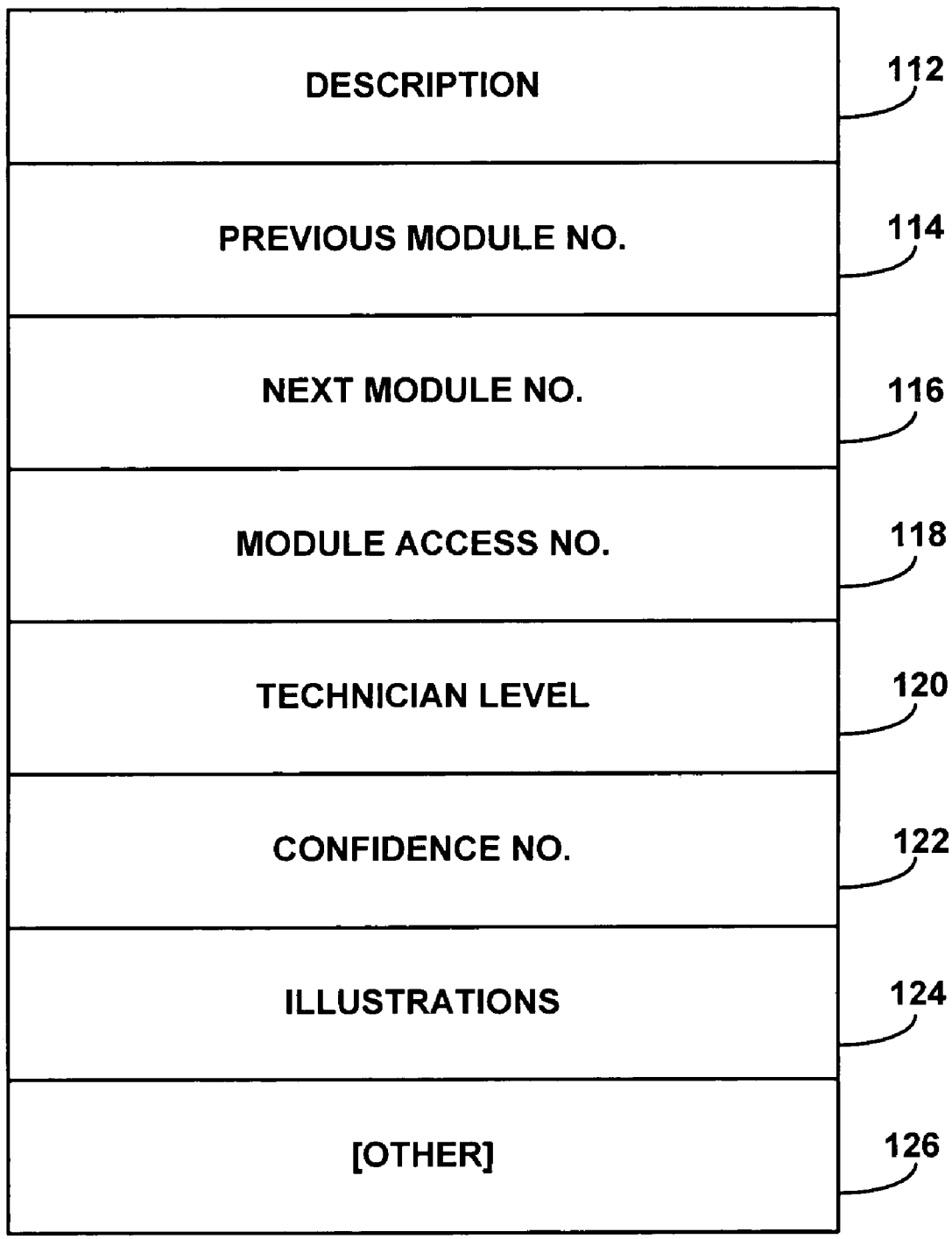
FIG. 3 is more detailed illustration of the block of memory representing an arbitrary test procedure or module in the fault tree of FIG. 2, showing the fields that may make up a given test module in a fault tree.

The GM 2.0L XYZ fault tree 50 can be stored in the database 12 of FIG. 1 or equivalently in the memory of the workstation 14. As shown in FIG. 3, each test module in a fault tree includes a number of different fields, including a description field 112, a field 114 identifying the previous module in the sequence of the fault tree, a field 116 identifying the next module in the sequence, a field 118 containing a number indicating the number of times the module has been accessed (the first set of numbers in the set 80 of FIG. 2), a field 120 indicating a technician level in which the module is displayed in the fault tree, a field 122 containing a confidence score for the module, a field 124 containing illustrations or photographs associated with the module (or links to such illustrations or photographs), and other fields 126, which could contain other data such as notes from technicians or service experts, outputs of the module, diagnosis, or other information. Obviously, the content and nature of the fields will vary depending on the nature of the machine in question and the particular fault tree. The fault tree may be represented in memory in any suitable form.

One of the features of this disclosure is that the fault tree of FIG. 2 is updated and prioritized using statistical feedback from technicians in the field. By following the features of the present method, improved fault trees can be developed. A benefit is that the technicians work more efficiently and more likely to arrive at the correct diagnosis of a machine fault quickly than they otherwise would.

As noted above, service data is obtained from a plurality of service occasions for like machines. The service data could be obtained from a plurality of geographically distributed technicians all servicing the same type of machine. Alternatively, the service data could be obtained from multiple technicians in the same repair facility. The service data could include information such as the make and model of the machine, the symptom that prompted the service occasion, the fault tree that was used, the modules of the fault tree that were accessed, the result of the testing on each module, the ultimate diagnosis, machine conditions that were recorded during the service (e.g., failure codes, temperatures, wear readings, etc.), the repairs made, notes or comments from the technician; other repairs made, etc. The service data can be acquired manually and input into a computer and transmitted to the host system 10 where the method is executed; alternatively the service data could be obtained by a computer-based diagnostic tool or system such as the MODIS system or the system described in U.S. Pat. No. 6,714,846 to Trsar et al.

Figure 4:
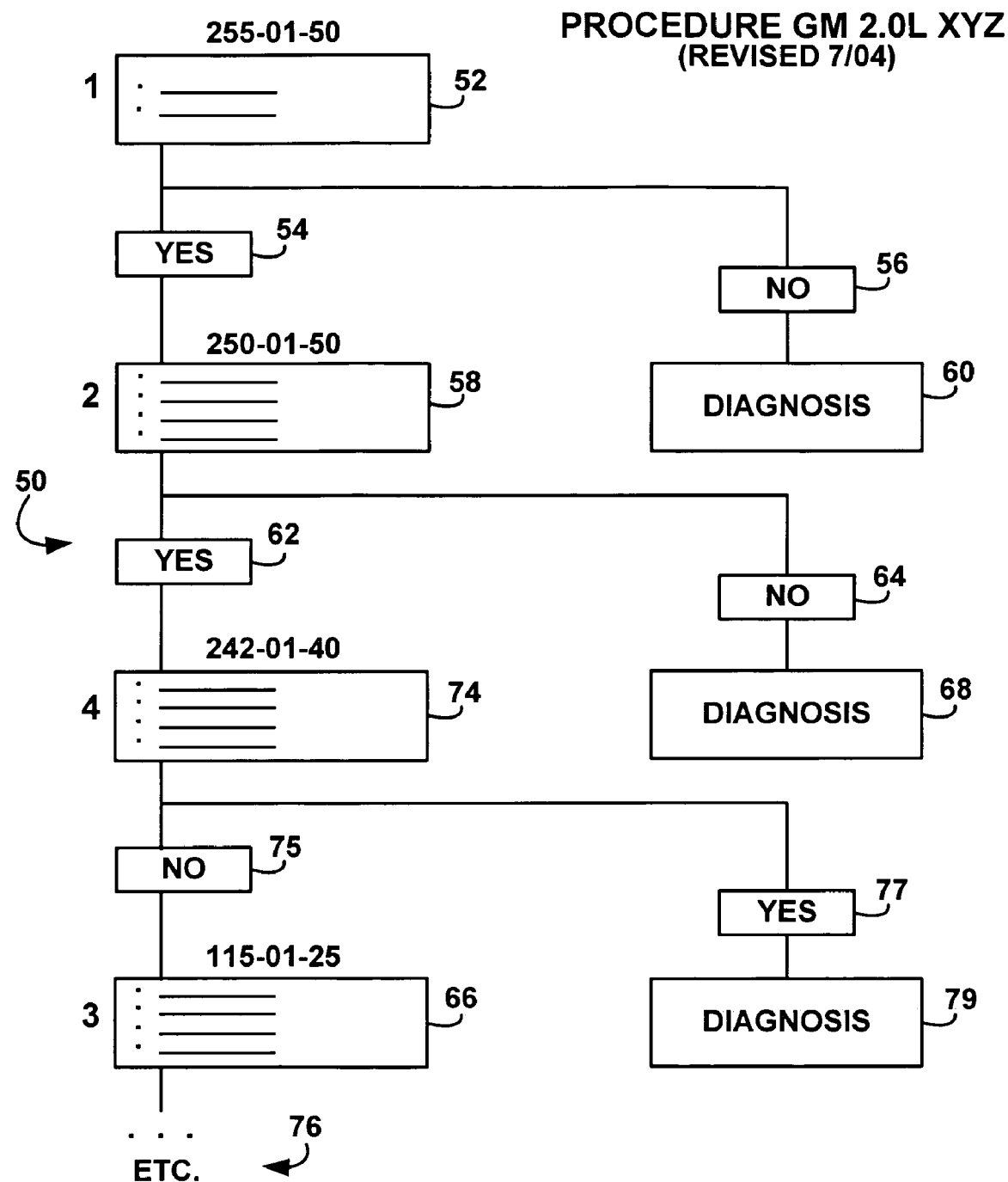
FIG. 4 shows a revision to the fault tree of FIG. 2, which would result from the use of the statistical feedback features of this disclosure.

The method further includes the step of revising the confidence scores 86, 90 for at least one test module in the fault trees, based on the service data. This step could be performed by a human operator based on their expert evaluation of the service data, or automatically by a programmed computer executing an algorithm that processes fields in the service data. For example, the computer could determine that, over a given period of time such as six months (provided that there is a suitable number of service occasions to be statistically significant, say 100), module number 4 (74) in the fault tree GM 2.0 L XYZ (50) was more likely to lead to a successful diagnosis than module 3 (66) but module 4 has a lower confidence score, the situation shown in FIG. 2. Accordingly, the computer reassigns confidence scores such that module 4 (74) is ranked higher than module 3. Thus, as shown in FIG. 4, after processing the service data in the database 12, the module 4 (74) has been assigned a confidence score of 40 (increasing it from 30 in FIG. 2), and module 3 (66) has been assigned a confidence score of 25 (decreasing it from 45 in FIG. 2).

The method further includes a step of revising the sequence of the test modules in the fault tree based on the revised confidence score(s). This is shown in FIG. 4. The algorithm proceeds to process each of the blocks of memory shown in FIG. 3, changes the confidence score field 122, and changes the ordering or sequence by changing the fields 114 and 116 to re-order the sequence of modules in the fault tree. The result is displayed on the workstation 14 of FIG. 1. Continuing the above hypothetical example, the computer revises the fault tree such that module 4 (74) is listed in the fault tree before module 3 (66). Assuming that a statistically significant sampling of service data is available and used to revise the confidence stores (a situation that can be controlled by only allowing the algorithm to execute when there is a sufficiently large number of service occasions uploaded into the database), and assuming that he technician has access to and uses the revised fault tree of FIG. 5, a technician following the revised fault tree is more likely to arrive at a correct diagnosis in a shorter amount of time than he otherwise would have had he used the previous fault tree. Thus, in general and as a matter of statistical probability, the revised fault tree allows the technician to work more efficiently.

As an alternative embodiment, the fault trees could be revised in an automated fashion as described herein and then presented to the subject matter experts 16 in FIG. 1 as proposed new fault trees for further review, editing, or approval.

The revised fault trees can be distributed to technicians in the field in any number of ways, including delivering hard copies of repair manuals containing the fault trees, delivering computer disks containing repair information and the updated fault trees, sending the revised fault trees as attachments to electronic mail, or by posting the revised fault trees as a file on an central server that the technicians access over a computer network (e.g., a local or wide area network, e.g., Internet), a telephone line, or wireless networking technique.

Further, while the illustrated embodiment below show a process for revising one fault tree, it will appreciated that, for any given machine (such as the GM 2.0L engine), the process may be going on in parallel for all of the fault trees that exist for the machine. In the example of a service entity or host system 10 that provides tools and diagnostic aids for the automobile repair industry in the United States, this process may be going on in parallel for literally thousands of fault trees, covering the year, make and model of diverse car manufacturers since 1980 and the various ailments and repair procedures for each of the individual models. In this situation, and in other analogous situations, computer automation of the process of updating confidence scores based service data and preparation of revised fault trees as disclosed herein is particularly advantageous. Additionally, the workstation 14 could be programmed to perform the update process as described herein periodically, such as yearly, or periodically based on the number of service occasions, such as every 100 service occasions.

Insofar as the embodiments described herein may include or be utilized in machines taking the form of vehicles or engines for vehicles, they may be used with any appropriate voltage or current source, such as a battery, an alternator, a fuel cell, and the like, providing any appropriate current and/or voltage, such as about 12 Volts, about 42 Volts and the like. The embodiments described herein may be used with any desired system or engine. Those systems or engines may be comprised of items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

Furthermore, the disclosure is applicable to fault trees and machines generally and is not limited to any particular field of application.

Variation from the particulars of the disclosed embodiments is contemplated. For example, the form of the fault tree is not particularly important. The nature of the service occasions, the service data stored in the database, the host system and the nature of the machine, the service or the repair in question (exhaust, brakes, ignition, wheel alignment, etc.) will depend on the machine the fault tree is designed for and the details are not critical. The design of the host system (and possible incorporation of the database 12 into the workstation 14) is not important. The confidence scores could be in the form of an index such as "high", "very high", "medium", or on some other numerical scale such as 1 to 10, 1 to 5, 0 to 1, or otherwise. Questions of scope of this patent are to be determined by reference to the appended claims and legal equivalents thereof.

We claim:

1. A method for updating a fault tree used in diagnosis of a condition of a machine, the fault tree comprising a sequence of test modules, each of the test modules being assigned a confidence score, the confidence score representing a probability that the associated test module will lead to a correct diagnosis of the machine condition, the method comprising the steps of:

obtaining service data from a plurality of service occasions for like machines;

revising the confidence score for at least one test module in the fault tree based on the service data; and revising the sequence of the test modules in the fault tree based on the revised confidence score(s).

2. The method of claim 1, wherein the service data is obtained from a plurality of geographically distributed service facilities.

3. The method of claim 1, wherein the confidence scores are revised by a human operator.

4. The method of claim 1, wherein the confidence scores are revised by a computing device processing the service data using an algorithm embodied as a series of machine-readable instructions.

5. The method of claim 1, wherein the revising step comprises the step of rearranging the test modules into an order in which the sequence of test modules is from the module with the highest confidence score to the lowest confidence score.

6. The method of claim 1, further comprising the step of distributing the revised fault tree to a plurality of geographically distributed service technicians for the machine.

7. The method of claim 1, wherein the machine comprises a component of a motorized vehicle.

8. The method of claim 1, wherein the machine comprises an internal combustion engine or component thereof.

9. A method for updating a fault tree used in diagnosis of a condition of a machine, the fault tree comprising a sequence of test modules, each of the test modules being assigned a confidence score, the method comprising the steps of:

obtaining service data from a plurality of service occasions for like machines;

revising the confidence score for at least one test module in the fault tree based on the service data; and revising the sequence of the test modules in the fault tree based on the revised confidence score(s); wherein at least one test module in the fault tree is assigned a technician level score in addition to the confidence score.

10. The method of claim 9, wherein each test module in the fault tree is assigned a technician level score in addition to the confidence score.

11. A method for updating a fault tree used in diagnosis of a condition of a machine, the fault tree comprising a sequence of test modules, each of the test modules being assigned a confidence score, the method comprising the steps of:

obtaining service data from a plurality of service occasions for like machines;

revising the confidence score for at least one test module in the fault tree based on the service data; and revising the sequence of the test modules in the fault tree based on the revised confidence score(s); wherein at least one test module in the fault tree is assigned an access number in addition to the confidence score, the access number indicating the number of times a technician accessed the test module.

12. The method of claim 11, wherein each test module in the fault tree is assigned an access number in addition to the confidence score, the access number indicating the number of times a technician accessed the test module.

13. A system for generating a revised fault tree for a machine using statistical feedback, comprising:
   a computer system having a memory storing a fault tree;
   a database containing service data from a plurality of prior service occasions for like machines, the service occasions associated with the fault tree;
   a terminal for providing human access to the fault tree and the database;
   wherein the fault tree comprises a plurality of test modules each assigned a confidence score and wherein the confidence score is revised for at least one test module in the fault tree based on the service data and wherein the sequence of the test modules in the fault tree is revised based on the revised confidence score(s).

14. The system of claim 13, wherein the fault tree is revised by rearranging the test modules into an order in which the sequence of test modules is from the module with the highest confidence score to the lowest confidence score.

15. The system of claim 13, wherein at least one test module in the fault tree is assigned a technician level score in addition to the confidence score.

16. The system of claim 15, wherein each test module in the fault tree is assigned a technician level score in addition to the confidence score.

17. The system of claim 13, wherein at least one test module in the fault tree is assigned an access number in addition to the confidence score, the access number indicating the number of times a technician accessed the test module.

18. The system of claim 17, wherein each test module in the fault tree is assigned an access number in addition to the confidence score, the access number indicating the number of times a technician accessed the test module.

19. The system of claim 13, wherein the system distributes the revised fault tree to a plurality of geographically distributed service technicians for the machine.

20. The system of claim 19, wherein the distribution of the revised fault tree is performed electronically.

21. The system of claim 13, wherein system performs a revision of the fault tree on a periodic basis.

22. The system of claim 13, wherein the machine comprises a component of a motorized vehicle.

23. The system of claim 13, wherein the machine comprises an internal combustion engine or component thereof.

24. A system for generating a revised fault tree for use by a technician in diagnosing a condition of a machine using statistical feedback, comprising:
   a computer system having a memory storing a fault tree;
   a database containing service data from a plurality of prior service occasions for like machines;
   a set of machine instructions executed by the computer system wherein the instructions access the service data and revise a confidence score for at least one test module in the fault tree based on the service data;
   the instructions further comprising instructions revising the sequence of the test modules in the fault tree based on the revised confidence score(s).

25. The system of claim 24, wherein the fault tree is revised by rearranging the test modules into an order in which the sequence of test modules is from the module with the highest confidence score to the lowest confidence score.

26. The system of claim 24, wherein at least one test module in the fault tree is assigned a technician level score in addition to the confidence score.

27. The system of claim 26, wherein each test module in the fault tree is assigned a technician level score in addition to the confidence score.

28. The system of claim 24, wherein at least one test module in the fault tree is assigned an access number in addition to the confidence score, the access number indicating the number of times a technician accessed the test module.

29. The system of claim 28, wherein each test module in the fault tree is assigned an access number in addition to the confidence score, the access number indicating the number of times a technician accessed the test module.

30. The system of claim 24, wherein the system distributes the revised fault tree to a plurality of geographically distributed service technicians for the machine.

31. The system of claim 24, wherein the distribution of the revised fault tree is performed electronically.

32. The system of claim 24, wherein the system performs a revision of the fault tree on a periodic basis.

33. The system of claim 24, wherein the machine comprises a component of a motorized vehicle.

34. The system of claim 24, wherein the machine comprises an internal combustion engine or component thereof.

* * * * *